Patented Apr. 1, 1941

2,236,569

UNITED STATES PATENT OFFICE 2,236,569

SHORTENING TREATMENT

Donald P. Grettie, Chicago, Ill.

No Drawing. Application August 12, 1936,
Serial No. 95,631

2 Claims. (Cl. 99—163)

This invention relates to an improved process of treating edible fats and oils.

One of the objects of the invention is to provide a method for stabilizing against rancidity edible fats and oils such as lard, beef fat, hydrogenated cottonseed oil, and other vegetable and animal fats and oils and mixtures thereof.

Another object of the invention is to provide as an article of commerce, an improved shortening product stabilized against rancidity.

Another object of the invention is to provide an antioxidant for fats and oils which will retard the onset of rancidity and will issue a negative Kreis test during a relatively long induction period.

For the purpose of illustration, but not by way of limitation, the invention is hereinafter described as practiced with lard.

The present invention is based upon the discovery that the tendency of fats and oils to become rancid and to develop a positive Kreis test can be retarded by treatment with hydroxy monobasic aliphatic acids. This invention permits the stabilizing of fats and oils against rancidity without in any way affecting the characteristic flavor of the shortening treated.

Divers substances have been proposed from time to time as antioxidants for fats and oils, including aromatic acids and such polybasic acids as citric acid.

The present invention is particularly directed to certain of the hydroxy monobasic aliphatic acids, namely, those hydroxy monobasic aliphatic acids which have a hydroxyl radical relatively near the carboxyl end of the molecule as in the alpha or beta position.

Examples of hydroxy monobasic aliphatic acids which may be employed in carrying out the present invention are set out below:

Hydroxy acetic acid $CH_2OH.COOH$ _____ Glycolic acid

Hydroxy proprianic acids $CH_3CHOH.COOH$ _____ {Lactic acid / Hydrocrylic acid}
$CH_2OH.CHOH.COOH$ ___ Glyceric acid

Hydroxy butyric acids $CH_3CH_2CHOH.COOH$ ___ Hydroxy butyric acid
$CH_3(CHOH)_2COOH$ ____ Dihydroxy butyric acid
$CH_2OH(CHOH)_2COOH$ _ Trihydroxy butyric acid

Hydroxy valeric acids $CH_3(CH_2)_2CHOH.COOH$ _ Hydroxy valeric acid
$CH_3CH_2(CHOH)_2COOH$ _ Dihydroxy valeric acid
$CH_3(CHOH)_3COOH$ _____ Trihydroxy valeric acid
$CH_2OH(CHOH)_3COOH$ __ Quadhydroxy valeric acid

Hydroxy caproic acids $CH_3(CH_2)_3CHOH.COOH$ ____ Hydroxy caproic acid
$CH_3(CH_2)_2(CHOH)_2COOH$ __ Dihydroxy caproic acid
$CH_3CH_2(CHOH)_3COOH$ _____ Trihydroxy caproic acid
$CH_3(CHOH)_4COOH$ _____ Quadhydroxy caproic acid

Hydroxy heptylic acids $CH_3(CH_2)_4CHOH.COOH$ ____ Hydroxy heptylic acid
$CH_3(CH_2)_3(CHOH)_2COOH$ __ Dihydroxy heptylic acid
$CH_3(CH_2)_2(CHOH)_3COOH$ __ Trihydroxy heptylic acid
$CH_3CH_2(CHOH)_4COOH$ _____ Quadhydroxy heptylic acid
$CH_3(CHOH)_5COOH$ _____ Penthydroxy heptylic acid

Hydroxy caprylic acids $CH_3(CH_2)_5CHOH.COOH$ ____ Hydroxy caprylic acid
$CH_3(CH_2)_4(CHOH)_2COOH$ __ Dihydroxy caprylic acid
$CH_3(CH_2)_3(CHOH)_3COOH$ __ Trihydroxy caprylic acid
$CH_3(CH_2)_2(CHOH)_4COOH$ __ Quadhydroxy caprylic acid
$CH_3CH_2(CHOH)_5COOH$ _____ Penthydroxy caprylic acid
$CH_3(CHOH)_6COOH$ _____ Hexhydroxy caprylic acid

Hydroxy capric acids $CH_3(CH_2)_7CHOH.COOH$ ____ Hydroxy capric acid
$CH_3(CH_2)_6(CHOH)_2COOH$ __ Dihydroxy capric acid
$CH_3(CH_2)_5(CHOH)_3COOH$ __ Trihydroxy capric acid
$CH_3(CH_2)_4(CHOH)_4COOH$ __ Quadhydroxy capric acid
$CH_3(CH_2)_3(CHOH)_5COOH$ __ Penthydroxy capric acid
$CH_3(CH_2)_2(CHOH)_6COOH$ __ Hexhydroxy capric acid
$CH_3CH_2(CHOH)_7COOH$ _____ Septhydroxy capric acid
$CH_3(CHOH)_8COOH$ _____ Octhydroxy capric acid

Hydroxy lauric acids

| | |
|---|---|
| $CH_3(CH_2)_9CHOH.COOH$ | Hydroxy lauric acid |
| $CH_3(CH_2)_8(CHOH)_2COOH$ | Dihydroxy lauric acid |
| $CH_3(CH_2)_7(CHOH)_3COOH$ | Trihydroxy lauric acid |
| $CH_3(CH_2)_6(CHOH)_4COOH$ | Quadhydroxy lauric acid |
| $CH_3(CH_2)_5(CHOH)_5COOH$ | Penthydroxy lauric acid |
| $CH_3(CH_2)_4(CHOH)_6COOH$ | Hexhydroxy lauric acid |
| $CH_3(CH_2)_3(CHOH)_7COOH$ | Septhydroxy lauric acid |
| $CH_3(CH_2)_2(CHOH)_8COOH$ | Octhydroxy lauric acid |
| $CH_3CH_2(CHOH)_9COOH$ | Nonhydroxy lauric acid |
| $CH_3(CHOH)_{10}COOH$ | Dechydroxy lauric acid |

Hydroxy myristic acids

| | |
|---|---|
| $CH_3(CH_2)_{11}CHOH.COOH$ | Hydroxy myristic acid |
| $CH_3(CH_2)_{10}(CHOH)_2COOH$ | Dihydroxy myristic acid |
| $CH_3(CH_2)_9(CHOH)_3COOH$ | Trihydroxy myristic acid |
| $CH_3(CH_2)_8(CHOH)_4COOH$ | Quadhydroxy myristic acid |
| $CH_3(CH_2)_7(CHOH)_5COOH$ | Penthydroxy myristic acid |
| $CH_3(CH_2)_6(CHOH)_6COOH$ | Hexhydroxy myristic acid |
| $CH_3(CH_2)_5(CHOH)_7COOH$ | Septhydroxy myristic acid |
| $CH_3(CH_2)_4(CHOH)_8COOH$ | Octhydroxy myristic acid |
| $CH_3(CH_2)_3(CHOH)_9COOH$ | Nonhydroxy myristic acid |
| $CH_3(CH_2)_2(CHOH)_{10}COOH$ | Dechydroxy myristic acid |
| $CH_3CH_2(CHOH)_{11}COOH$ | Undhydroxy myristic acid |
| $CH_3(CHOH)_{12}COOH$ | Didecylichydroxy myristic acid |

Examples of monobasic sugar acids which may be employed in carrying out the present invention are set out below:

1. Pentose sugar acid___ $CH_2OH(CHOH)_3COOH$
2. Hexose sugar acid___ $CH_2OH(CHOH)_4COOH$ In the foregoing examples of the hydroxy monobasic aliphatic acids only the foundation formula is given in each instance. The present invention is not directed to all forms of each of these acids, but only to those forms in which a hydroxyl radical occurs in the carbon chain near the carboxyl end of the molecule.

I have found in practice that the invention may be effectively carried out with hydroxy monobasic aliphatic acids having a hydroxyl radical in the alpha or the beta position, or both. For convenience in illustrating the invention the constitutional formula is given for the alpha hydroxy and the alpha beta dihydroxy form of each acid where such forms occur.

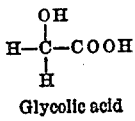

Glycollic acid

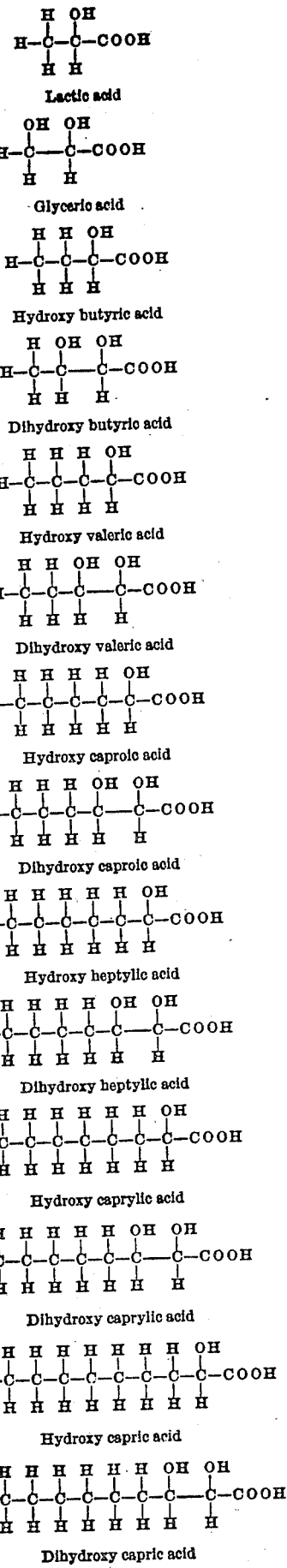

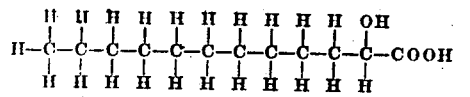

Hydroxy lauric acid

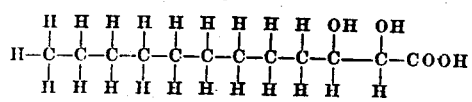

Dihydroxy lauric acid

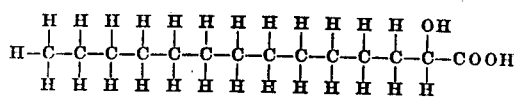

Hydroxy myristic acid

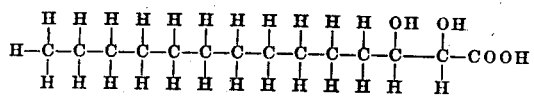

Dihydroxy myristic acid

It will be understood that other forms of the acids in question than those given may be employed, as will be clear to any chemist skilled in the art, for example, any of the dihydroxy butyric acids are effective whereas in the case of dihydroxy myristic acids those forms in which the hydroxyl radical closest to the carboxyl end of the molecule is not closer than the gamma position will be found ineffective, but if there is a hydroxyl radical in either alpha or beta position, the position of the other hydroxyl radical is unimportant and it may occur in the gamma, delta, epsilon, zeta, eta, theta, iota, kappa, lambda or mu position.

The theory which has been herebefore enunciated may be readily applied to such theoretical acids as hydroxy nonyllic acid, hydroxy undecylic acid, hydroxy tridecylic acid and hydroxy quindecylic acid.

By way of illustration I will describe the application of the invention with select hydroxy monobasic aliphatic acids in the stabilization of lard. I have found in practice that effective stabilization may be secured by the addition of not more than .001 per cent to .05 per cent lactic acid, glycolic acid or gluconic acid to lard. It will be understood, of course, that some stabilization is secured with smaller amounts and that the effect is progressive as the amount is increased although the addition of larger amounts gives little apparent increase in stabilizing effect.

Examples of stabilizing effect of three common hydroxy monobasic acids are given in the following table:

Table A

1. Lard (unstabilized).
2. Lard containing .01 per cent lactic acid.
3. Lard containing .1 per cent gluconic acid.
4. Lard containing .01 per cent glycolic acid.

| Hours incubation at 70° C. | Milliequivalents of peroxide oxygen per kilo of fat | | | |
|---|---|---|---|---|
| | 1 | 2 | 3 | 4 |
| 18 | 15 | 7 | 13 | 7 |
| 42 | 1 30 | 15 | 22 | 10 |
| 66 | 1 70 | 1 55 | 1 52 | 2 30 |

1 Rancid.
2 Faintly rancid.

The stability as determined by the accelerated active oxygen (peroxide keeping test) is as follows:

Hours
Lard _____ 2
Lard containing .01 per cent lactic acid _____ 3
Lard containing .01 per cent glycolic acid _____ 3
Lard containing .01 per cent gluconic acid ____ 4

It will be seen from the foregoing data that lactic, glycolic and gluconic acids have a positive stabilizing effect on lard.

Although lard has been discussed by way of illustration in describing this invention, it will be understood that the invention is not limited to lard but comprehends edible vegetable and animal fats and oils adapted for use as a shortening and the like. The word "shortening" as used in this specification and the claims which follow will be understood to include edible animal and vegetable fats and oils such as lard, beef fat, hydrogenated cottonseed oil, kapoc oils, sunflower seed oil, palm oil, soya bean oil and the like.

I claim:

1. The method of stabilizing shortening which comprises adding thereto and incorporating therewith from .001 per cent to .05 per cent of lactic acid.

2. As an article of commerce, shortening stabilized against rancidity containing .001 per cent to .05 per cent of lactic acid.

DONALD P. GRETTIE.